(12) United States Patent
Burnett et al.

(10) Patent No.: US 7,825,918 B2
(45) Date of Patent: Nov. 2, 2010

(54) SYSTEM AND METHOD FOR APPLYING POWER TO HIGH INTENSITY DISCHARGE LAMPS

(75) Inventors: Angela Renee Burnett, Indianapolis, IN (US); William Patrick Mc Carthy, Indianapolis, IN (US); Gene Harlow Johnson, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 735 days.

(21) Appl. No.: 10/580,807

(22) PCT Filed: Jan. 15, 2004

(86) PCT No.: PCT/US2004/000986

§ 371 (c)(1),
(2), (4) Date: May 25, 2006

(87) PCT Pub. No.: WO2005/062681

PCT Pub. Date: Jul. 7, 2005

(65) Prior Publication Data

US 2007/0132704 A1 Jun. 14, 2007

Related U.S. Application Data

(60) Provisional application No. 60/527,800, filed on Dec. 8, 2003.

(51) Int. Cl.
*G06F 1/00* (2006.01)
*G06F 3/038* (2006.01)
*G09G 3/36* (2006.01)

(52) U.S. Cl. ............... 345/211; 345/102; 345/213; 713/324; 315/360; 348/730

(58) Field of Classification Search ......... 345/211–214, 345/87–102; 713/324; 315/105–107, 360; 348/730
See application file for complete search history.

(56) References Cited

U.S. PATENT DOCUMENTS 5,136,397 A * 8/1992 Miyashita ............... 348/748
5,570,077 A    10/1996 Swieboda (Continued)

FOREIGN PATENT DOCUMENTS

JP    2001-85665    3/2001

(Continued)

OTHER PUBLICATIONS

Search report dated Nov. 19, 2004.

*Primary Examiner*—David L Lewis
(74) *Attorney, Agent, or Firm*—Robert D. Shedd; Harvey D. Fried; James McKenzie

(57) ABSTRACT

A liquid crystal display television receiver projection system uses a controller responsive to a first signal by providing power to a first set of circuits of the system. The controller is responsive to a second signal by removing power from a second set of circuits of the system;
A timer defines a time interval between an instance of a power off signal and an instance of a power on signal. In the event a user issues a power on command before the first interval has elapsed, power will be applied to circuits other than the lamp The lamp will remain de-energized until the first interval has elapsed. Therefore, a user is prevented from re-striking the lamp.

12 Claims, 4 Drawing Sheets

U.S. PATENT DOCUMENTS

| | | | |
|---|---|---|---|
| 5,699,082 A | 12/1997 | Marks et al. | |
| 6,704,061 B2 * | 3/2004 | Mears et al. | 345/102 |
| 6,788,009 B2 | 9/2004 | Fujii et al. | |
| 2002/0135324 A1 | 9/2002 | Fujii et al. | |
| 2003/0052822 A1 | 3/2003 | Rabinowitz et al. | |

FOREIGN PATENT DOCUMENTS

| | | |
|---|---|---|
| JP | 2002-55394 | 2/2002 |
| JP | 2001-283465 | 3/2003 |
| JP | 2001-192182 | 7/2003 |

* cited by examiner

SYSTEM AND METHOD FOR APPLYING POWER TO HIGH INTENSITY DISCHARGE LAMPS

This application claims the benefit, under 35 U.S.C. § 365 of International Application PCT/U.S. 2004/000986 filed Jan. 15, 2004, which was published in accordance with PCT Article 21 (2) on Jul. 7, 2005 in English and which claims the benefit of U.S. provisional patent application No. 60/527800 filed December 8, 2003.

BACKGROUND OF THE INVENTION

This invention relates to a power control circuit for a high intensity discharge lamp, for example of the type used in video displays. Typical liquid crystal display (LCD) and liquid crystal on silicon (LCOS) television (TV) projection systems utilize high-intensity discharge lamps (also referred to as bulbs) as image back lighting sources. High intensity discharge lamps typically operate with mercury vapor. Applying power to a partially energized mercury vapor lamp is to be avoided. Applying power to the lamp before the mercury vapor de-energizes, i.e., re-striking the lamp, shortens the lamp's life. To avoid this problem, some projection systems introduce a delay between power off and power on. This delay is sometimes referred to as a "restart" delay. The restart delay prevents a user from applying power to the television receiver until the mercury vapor lamp is substantially fully de-energized. An example of a typical restart delay time is approximately 30 seconds. Introducing a restart delay in this manner can be annoying to a user. Users have come to expect instant restart of their television sets since instant response is typical with television receivers that do not employ high-intensity discharge lamps. A typical high intensity discharge lamp can take approximately 30 seconds for the bulb to cool down and approximately another 30 seconds for the bulb to reheat.

Therefore a need exists for circuits and methods for applying power to such systems in a way that minimizes user perception of delay while preserving the life of the mercury vapor lamp.

SUMMARY OF THE INVENTION

The invention provides a video display apparatus comprising an image lighting lamp; a power on control circuit, a power off control circuit and a timer. The power on control circuit energizes selected circuits of the video display in response to a power on control signal. The power off control circuit de-energizes circuits of the video display in response to a power off control signal. The timer is coupled to the image lighting lamp so as to maintain the lamp in a de-energized state during a time interval that follows the occurrence of the power-off control signal. The power on control circuit selects circuits for energizing in response to a power on control signal based upon a condition of the timer.

DETAILED DESCRIPTION

Figure 1:
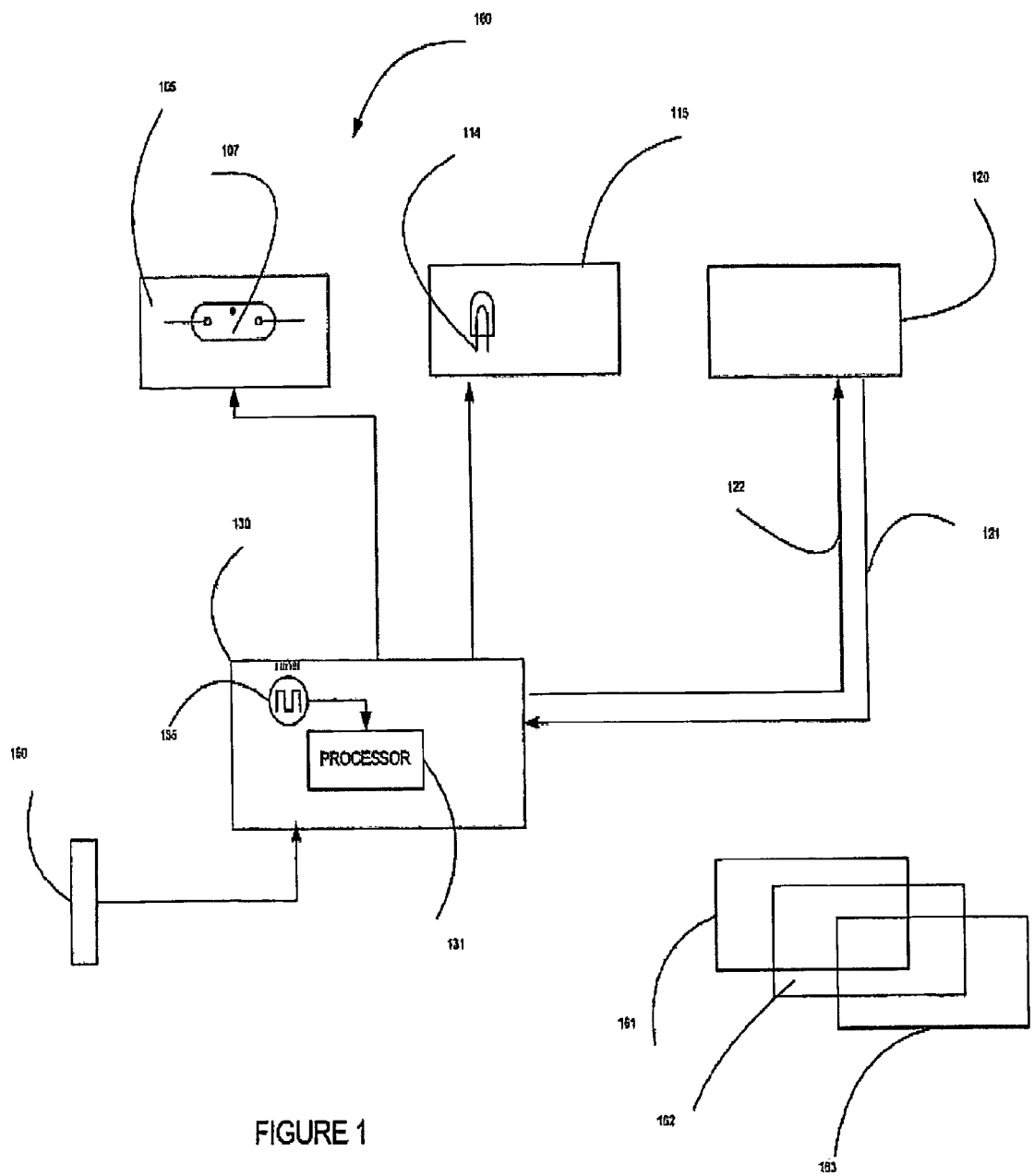
FIG. 1: is a block diagram of a system for applying power to a high intensity discharge lamp according to an embodiment of the invention.

With the introduction of micro display systems for consumer televisions, efficient handling of the transition between a "power off" state and a "power on" state for the system is desirable. After powering a micro display system off, the power to the lamp typically remains off, and cannot be re-applied for a length of time. This time period allows the lamp to cool down before being powered back on. The time period sufficient for a given device depends upon the type of lamp and its associated electronics. In an embodiment of the invention, a sufficient time period is about 30 seconds. Time periods of more than, and less than about 30 seconds are appropriate depending on the device. Appropriate time periods include those determined and recommended by the lamp manufacturer. In any case, failure to enforce a sufficient cool down period sometimes results in reduced lifetime of the lamp. Therefore, systems and methods to extend the lifetime of the lamp while responding to user commands are needed.

As used herein, the term "power on state" refers to an operationally ready state wherein operating power is applied to circuits and subsystems, including a lamp subsystem, such that the system is capable of near real time response to at least one user command to perform a function corresponding to the command. The term "partial power on" and "partial power on state" refer to operationally ready states wherein operating power is applied to circuits other than a lamp power circuit. The term "power off state" refers to a state in which a system is not operable to perform common user functions such as tuning. In one embodiment of the invention, a power off state is a state wherein substantially all of the power is absent from a plurality of circuits and sub systems of a system. However, in a power off state according to one embodiment of the invention, at least one circuit is provided with power for responding to "power on" commands from a user while the system is in a power off state. This at least one circuit maintains a power level sufficient to enable the system to receive, interpret and respond to the "power on" command from a user in accordance with the steps of the methods of the invention described herein.

Commands for energizing a system are generally referred to herein as "Power on" commands. Such commands provide a first signal to the system to remove power. Those of ordinary skill in the art will recognize "Power on " as a general type of command capable of representation by a number of names and symbols, all of which have the same meaning. For example, the words "Power" and "On" as well as a variety of symbols and other graphical indications such as light bulbs, a green color, etc are commonly employed to indicate a power on function. Likewise, the power off command has a variety of corresponding indications and representations to indicate that power is removed from a system.

A wide variety of user operable devices exist for communicating signals, representing commands from a user to a system. Suitable user operable devices include those capable of providing at least a first and a second signal to a system. A first signal represents a power on command. A second signal represents a power off command. Conventional power on and power off signals are relayed from a user operable device to a system by a wide variety of known user operable devices including buttons, switches, voice activation, relays, software switches, vibration activation, touch screen activation, and others too numerous to mention. Similarly, a wide variety of communication links are in use to transmit first and second signals from a user operable device to a system. These include, but are not limited to front hardware and software implemented switches and actuators, as well as remote controllers relaying signals by electromagnetic, infrared, wired or wireless means.

Without power, systems, circuits and subsystems are typically not operable to perform all of their designated functions. Consumers are accustomed to an immediate response to power on commands initiated either by remote control or the front panel. However, as discussed above the characteristics of the lamps typically utilized in micro display systems often preclude an immediate response to a user command to apply power to a system. One example is a command to apply power to a system including a mercury vapor lamp, when the power on command is received before the vapor has substantially de-energized. In that case, power on is typically delayed until after a lamp cool down period has expired. A lamp cool down period allows mercury vapor to substantially de-energize before power is again applied to a lamp.

This invention outlines a method and system by which a system transition from a power off state to a power on state during a lamp cool down period is implemented efficiently. This is done by enabling power to be applied to circuits and systems other than Light Engine circuits, during the lamp cool down period. Light engine circuits are circuits involved in energizing a high intensity discharge lamp such as a mercury vapor bulb.

FIG. 1 is a block diagram illustrating an embodiment of the invention. Display system 100 comprises a plurality of television circuits and subsystems as represented by indicators 105-199. Circuits 161-199 perform typical television functions such as tuning (tuner circuit 161), speaker control (circuit 162), Audio Video (A/V) input output functions (A/V circuits 163), and the like.

In one embodiment of the invention, system 100 utilizes a high-intensity discharge lamp 107 to form a back light source for a light valve of an LCOS display. In an embodiment of the invention, high intensity discharge lamp 107 is a mercury vapor lamp and power circuits 105 comprise power circuits for high-intensity discharge lamp 107 (also referred to herein as a light engine). In addition to high-intensity discharge lamp 107, system 100 further comprises a power controller 130 including at least a timer 135; at least one processor 131; a power indicator circuit 115 including a power indicator 114; a partial power on flag circuit 120; and a user operable control device 150. User operable control device 150 is capable of communicating commands, including power on and power off commands from a user to processor 131. In one embodiment of the invention power indicator 114 is a light emitting diode (LED). However, as those of ordinary skill in the art will readily appreciate upon reading this specification, there are a great number of known visual indicators available in the art and suitable for use in the invention to signal system conditions to a user.

In one embodiment of the invention, processor 131 includes a memory 132 for storing user commands. Processor 131 receives user commands from user operable control device 150. In response to user commands, processor 131 provides control signals to circuits 105-199 of system 100. Processor 131 is capable of independently controlling circuits and subsystems 105-199 of system 100 according to one embodiment of a method of the invention. In one embodiment of the invention, processor 131 is capable of selecting and controlling a first set of circuits, for example, the set comprising circuits 161, 162 and 163, independently of a second set of circuits for example the set comprising lamp subsystem 105.

In one embodiment of the invention, processor 131 is capable of controlling lamp subsystem 105 independently of all other subsystems.

Figure 2:
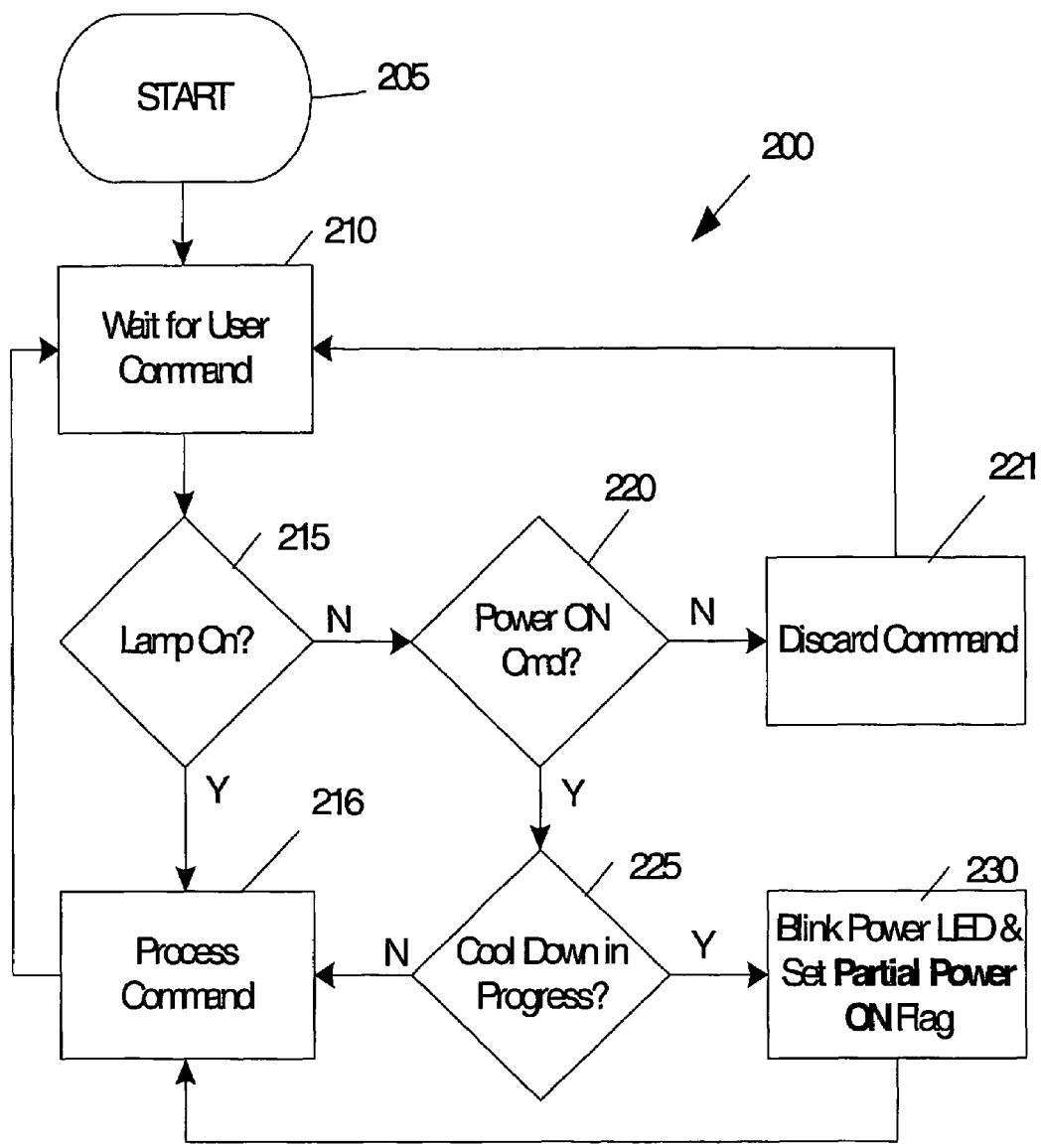
FIG. 2: is a flow chart illustrating the steps of a method for processing user commands for the system illustrated in FIG. 1 according to an embodiment of the invention.

FIG. 2 is a flow chart outlining steps of a method 200 for processing user commands according to an embodiment of the invention. In an embodiment of the invention, processor 131 executes a program to carry out the steps of the method. A program in the present context means any expression, in any language, code or notation, of a set of instructions intended to cause a device having processing capability to perform a particular function either directly or after either or both of the following a) conversion to another language, code or notation; b) reproduction in a different material form. In one embodiment of the invention, the method of FIG. 2 is used with system 100 of FIG. 1 and is implemented by processor 131 of system 100. Therefore, reference is made below to FIG. 1 and FIG. 2.

Process 200 starts as indicated at 205, wherein processor 131 waits until a command is received from user operable control device 150 according to step 210. Upon receipt of a user command, processor 131 checks the state of power to high intensity discharge lamp 107 (hereinafter, lamp 107). If power is applied to lamp 107, processor 131 processes the user command as illustrated in step 216. Then, processor 131 returns to the wait state of step 210.

If processor 131 determines power is not applied to lamp 107, processor 131 determines if the command received from user operable control device 150 is a power on command as indicated at step 220. If the command is not a power on command, for example, if the command is a tuning command, processor 131 discards the command as illustrated in step 221. Then, processor 131 returns to the wait state as shown in step 210.

On the other hand, if processor 131 determines in step 220 the command is a power on command, further processing is carried out. In one embodiment of the invention, processor 131 checks the state of timer 135 to determine if a cool down interval is in progress as indicated at step 225. If timer 135 is timing a cool down interval, it is not desirable to apply power to lamp 107. However, circuits other than lamp power circuits can safely be powered on. In that case processor 131 sets partial power flag 120 and causes power on LED 114 to blink. Processor 131 then processes the command, and waits for the next command. In one embodiment of the invention, if the command is a power on command, processor 131 processes the command according to the method illustrated in FIG. 3. In an embodiment of the invention, this step occurs without intervention from the user. To the user, execution of the forgoing steps may be indistinguishable from a lamp error, for example the error that occurs when restriking lamp 107. However, in one embodiment of the invention, an LED indicator 114 blink sequence is implemented such that a user can differentiate between a partial power on condition and an lamp error condition of system 100.

Figure 3:
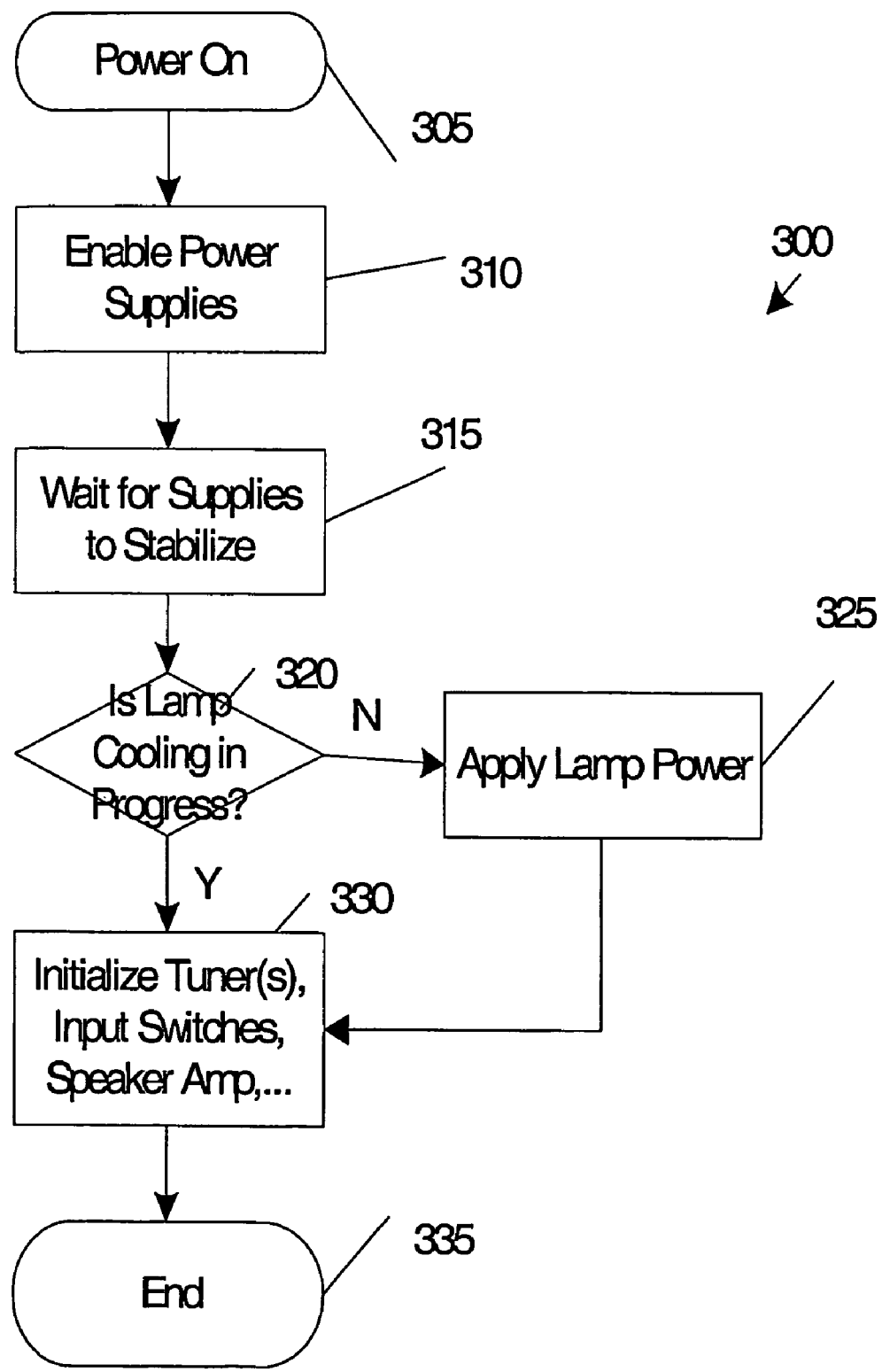
FIG. 3: is a flow chart illustrating the steps of a method for applying power to the system illustrated in FIG. 1 according to an embodiment of the invention.

FIG. 3 illustrates steps of a method for processing a power on command such as indicated in step 216 of FIG. 2. For purposes of explanation reference will be made below to FIGS. 1 and 3. When a power on command is to be processed (for example as per step 216 of FIG. 2) the method starts as indicated at start step 305. At step 310, processor 131 enables power to circuits selected from the group comprising circuits 106-199, not including lamp power circuits 105. In one embodiment of the invention, processor 131 enables power to a first subset of circuits 106-199 at step 310. The first subset excludes lamp power circuit 105. In one embodiment of the invention, the first subset comprises tuner power circuit 161, speaker power circuit 162 and Audio Visual (A/V) input circuits 163. In another embodiment of the invention, the first subset includes, but is not limited to, tuner power circuit 161, speaker power circuit 162 and Audio Visual (A/V) input circuits 163.

According to one embodiment of the invention, at step 315 processor 131 waits for power supplies of the circuits enabled in the previous step 310 to stabilize, e.g, to reach a quiescent state. Next, in step 320, processor 131 determines if a cool down interval is in progress. In one embodiment of the invention, processor 131 checks timer 135 to determine if a cool down interval is in progress. In an alternative embodiment of the invention, processor 131 checks partial power on flag 120 to determine if a cool down interval is in progress. If a cool down interval is not in progress, processor 131 enables power to lamp circuit 105 as indicated at step 325. On the other hand, if a cool down interval is in progress, processor 131 initializes the first subset of circuits selected in step 310 and waits for the next command. This step is indicated at 330. In other words, processor 131 prepares the first subset of circuits for operation and response to user commands, but does not apply power to the high intensity lamp 107, if lamp cool down is in progress.

Once the first subset of circuits are initialized system 100 can operate substantially fully, excepting any on screen functions. In one example, the appropriate channel will be tuned and the correct input will be selected in response to user commands. Audio commands will be enabled. The command processing that is available when system 100 is powered on is enabled. This allows a user to change channels or inputs and adjust the volume when the cool down interval is in progress. Next, according to one embodiment of the invention, processor 131 stops until the next power on command is received as indicated at step 335.

Figure 4:
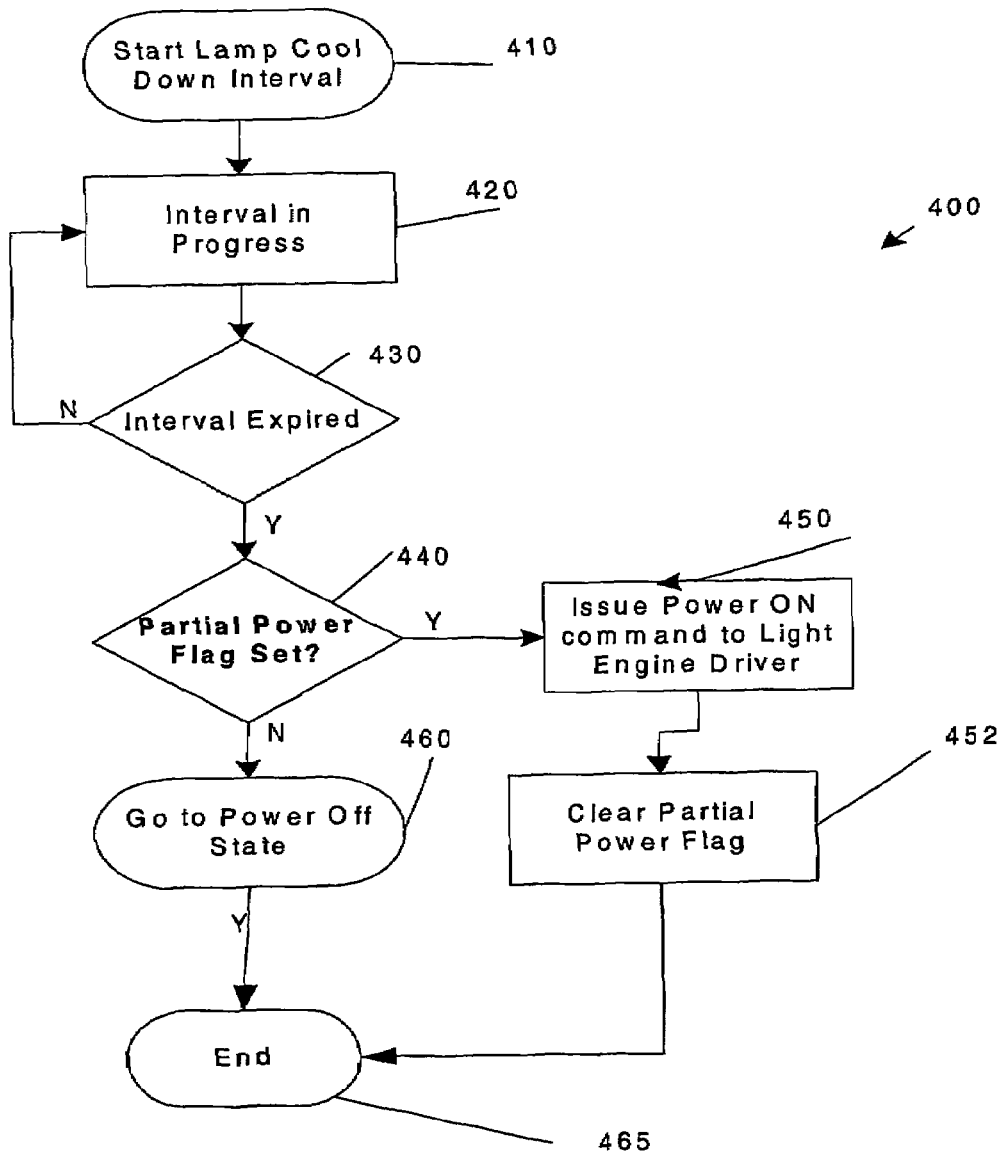
FIG. 4: is a flow chart illustrating the steps of a method for timing a cool down interval according to an embodiment of the invention.

FIG. 4 illustrates one method 400 for operating timer 135 of system 100 according to an embodiment of the invention. As those of ordinary skill in the art will recognize, the specific implementation of timer 135 will vary depending on the software and hardware architecture of system 100. According to one embodiment, timer 135 is started when system 100 receives a power off command from a user. Timer 135 is then checked periodically to determine whether the cool down interval has expired. In one embodiment of the invention, a simple counter is used to implement timer 135.

In one embodiment of the invention lamp cool down timer 135 begins timing a cool down interval when processor 131 receives a power off command as indicated at 410. In step 420, timer 135 times the time interval. In one embodiment of the invention the interval is about 30 seconds. In another embodiment of the invention, the interval is about 60 seconds. However, those of ordinary skill in the art will recognize that any desired time interval for allowing discharge of lamp 107 is suitable for use in the timer 135 of the invention. Sufficient time intervals include those determined and recommended by the manufacturer of lamp 107 and are readily determined. In one embodiment of the invention timer 135 is set as per manufacturer recommendations and is factory adjustable.

At step 430 processor 131 determines if the time interval has expired. If the time interval is not expired, timer 135 continues to time the interval until the interval expires. Upon expiration of the interval, partial power on flag 120 is tested, as illustrated in step 440. If partial power on flag 120 is set, power will be applied to lamp 107 according to step 450.

When processor 131 determines the time interval has expired, processor 131 checks the status of partial power on flag 120, as indicated in step 440. If partial power on flag 120 is set (for example as by step 230 illustrated in FIG. 2) processor 131 enables power to lamp 107 as indicated at step 450. In an embodiment of the invention, a set partial power flag indicates receipt of a power on command during a cool down interval. At step 452, processor 131 clears partial power on flag 120 and the process 400 ends. If partial power on flag 120 is not set, processor 131 proceeds by placing system 100 in a power off state.

In light of the foregoing description of the invention, it will be recognized that the present invention can be realized in hardware, software, or a combination of hardware and software. The system and method according to the present invention is capable of realization in a centralized fashion, or in a distributed fashion where different elements are spread across several interconnected circuits. The description above is intended by way of example only and is not intended to limit the present invention in any way, except as set forth in the following claims.

The invention claimed is:

1. A video display comprising:
   a controller responsive to a first signal by providing power to a first set of circuits of said display;
   said controller responsive to a second signal by removing power from a second set of circuits of said video display;
   a timer defining a time interval between an instance of said second signal and an instance of said first signal;
   wherein, during said time interval, said first set of circuits excludes a lamp power circuit and said second set of circuits includes said lamp power circuit.

2. The video display of claim 1 wherein said lamp power circuit is coupled to an image lighting lamp.

3. The video display of claim 2 wherein said image lighting lamp is a mercury vapor lamp.

4. The video display of claim 1 wherein, outside of said time interval said first set of circuits and said second set of circuits are substantially the same.

5. A video display comprising:
   a controller capable of responding to a first signal by energizing a first set of circuits of said display;
   said controller capable of responding to a second signal by de-energizing a second set of circuits of said display;
   a timer defining a tine interval between an instance of said second signal and an instance of said first signal;
   wherein said controller selects a lamp power circuit as a members of said first set of circuits based upon a condition of said timer.

6. The display of claim 5 wherein said first signal is a power on signal and said second signal is a power off signal.

7. The display of claim 6 wherein said tinier comprises a lamp cool down timer far a high intensity discharge lamp.

8. The video display of claim 1 wherein said first signal and second signals are provided by a user operable control device.

9. A video display system comprising:
   an image lighting lamp;
   a control circuit for applying and removing power for said image lighting lamp;
   said control circuit including a timer;
   said timer commencing a time interval when said control circuit removes power from said image lighting lamp;
   said control circuit maintaining said image lighting lamp de-energized during said time interval;
   wherein said control circuit is capable of applying power to circuits of said video display apparatus, other than said image lighting lamp, during said time interval.

10. A method for applying power to circuits of a video display, the method comprising the steps of:
    applying power to a first set of said circuits in response to a first signal;

removing power from a second set of said circuits in response to a second signal;

defining a time interval between an instance of said second signal and an instance of said first signal and during which said first set of circuits excludes a lamp power circuit and said second set of circuits includes said lamp power circuit and outside of which, said first set of circuits is the same as said second set of circuits.

11. A method for applying power to circuits of a video display, the method comprising the steps of:

applying power to a first set of said circuits in response to a first signal;

removing power from a second set of said circuits in response to a second signal;

indicating a time interval between an instance of said second signal and an instance of said first signal;

determining if a lamp power circuit is a members of said first set of circuits based upon said indication.

12. In a video display apparatus, a method for controlling an image lighting lamp circuit, the method comprising the steps of:

energizing selected circuits of said video display apparatus in response to a power on control signal;

de-energizing circuits of said video display in response to a power off control signal;

utilizing said power off control signal to start a timer;

providing an indication of a condition of said timer;

wherein said selected circuits exclude said image lighting circuit based upon said indication.

* * * * *